United States Patent [19]

Jackson et al.

[11] 4,007,877

[45] Feb. 15, 1977

[54] ADJUSTABLE STEM SPRINKLER DROP

[75] Inventors: Jimmy Jackson, Macon; William D. Roquemore, Musella, both of Ga.

[73] Assignee: James C. Hays, Macon, Ga. ; a part interest

[22] Filed: May 18, 1976

[21] Appl. No.: 687,487

[52] U.S. Cl. ................................ 239/209; 239/281; 169/37; 285/302; 285/276; 285/339

[51] Int. Cl.² .................. B05B 15/08; A62C 37/10; F16L 27/12

[58] Field of Search ............... 239/273, 280, 280.5, 239/281, 209, 1; 169/37, 51, 16, 42, 43; 285/339, 343, 104, 105, 122, 415, 276, 302

[56] References Cited

UNITED STATES PATENTS

| | | | |
|---|---|---|---|
| 1,182,710 | 5/1916 | Rowell | 285/415 X |
| 1,936,815 | 11/1933 | Wilkinson | 285/339 X |
| 3,294,359 | 12/1966 | Bauer | 285/276 X |
| 3,847,392 | 11/1974 | Horwinski | 239/209 X |
| 3,958,819 | 5/1976 | Tifft | 285/302 |

*Primary Examiner*—Robert S. Ward, Jr.
*Attorney, Agent, or Firm*—A. Yates Dowell, Jr.

[57] ABSTRACT

An adjustable stem drop apparatus and method for a fire extinguishing sprinkler mounted on a pipe located above the ceiling of a building and arranged in such a manner that the position of the sprinkler can be adjusted from below the ceiling after the ceiling has been permanently installed.

5 Claims, 3 Drawing Figures

ADJUSTABLE STEM SPRINKLER DROP

BACKGROUND OF THE INVENTION

1. Field of the Invention

This invention relates generally to fire protection sprinklers of various kinds and relates particularly to sprinkler systems in which a header or branch line is located above a ceiling and is provided with a plurality of drops having adjustable stems which extend downwardly through the ceiling and are provided with sprinklers which automatically operate when the heat within a building caused by fire reaches a predetermined temperature.

2. Description of the Prior Art

In the fire protection industry a sprinkler installation is by definition a means for automatically extinguishing or controlling a fire in its early stages by a system of overhead pipes fitted with devices which operate automatically in case of fire through the action of a heat sensitive feature in its design. The sprinkler installation discharges water under pressure in the form of a spray from one or more sprinkler heads at or near the point of origin of the fire. Ordinarily, an alarm is sounded simultaneously to summon aid to complete the extinction of the fire if necessary and to insure that steps are taken to minimize water damage after the fire is out. When the heat sensitive feature of the system is triggered, water is discharged in all directions below the plane of the sprinkler in a spray pattern which is roughly that of a half sphere substantially filled with water spray. Normally, no water is discharged upwardly to wet the ceiling.

There are many types of sprinkler systems which principally use spray sprinklers for discharge nozzles. Some of these systems include: a wet pipe system in which the piping is normally charged with water under pressure; a dry pipe system in which the piping is normally charged with air under pressure but into which water is automatically admitted when a sprinkler opens; a deluge system in which the pipes normally are empty and open at the heads and the heat sensitive feature is a separate network of heat detectors which control the flow of water; and a preaction system in which there is a separate network of pipes and sealed heads used with pneumatic or electrical detectors that control the introduction of water into the distributive system.

When a sprinkler system is being installed in a building under construction, a plurality of headers or branch lines, which are to be connected to a water main or other source of water under pressure, are installed in generally parallel relationship with each other before the ceiling is constructed. Each of the headers includes a plurality of vertically disposed drops or nipples having pipe threads on at least one end which are connected to the header and such drops normally extend downwardly through an imaginary line which is indicative of the location of the finished ceiling. When the ceiling is being constructed, the plasterboard, acoustic tile or other ceiling material is provided with holes through which the lower ends of the drops project. After the ceiling is substantially completed, the drops are measured, taken out, cut off and threaded, supplied with a desired sprinkler, and are reconnected to the concealed headers or branch lines. This has been difficult since it usually requires that the workman have access to the area above the ceiling so that the pipe threads at the upper ends of the drops may be tightened.

Normally ceilings may be either fixed or floating. In a fixed ceiling the ceiling material is connected directly to rafters or other structure between floors of a building, and in a floating ceiling the ceiling material is usually mounted on a framework or grid which is suspended from the rafters with a space between the ceiling material and the rafters. Frequently a floating ceiling is constructed of acoustical tile or the like which can be removed to provide access to the space above the ceiling, but fixed ceilings have been especially difficult since the drops must be fitted using trial and error methods based on an estimated location of the finished ceiling.

In the past some efforts have been made to reduce the amount of labor involved which is required in removing and changing the length of the sprinkler drops and these efforts have included adjustable sprinkler drops which are threaded on the end to receive a sprinkler and are telescopically mounted on the header. However, these prior art devices have been used primarily with floating ceilings since some access must be had above the ceiling after the ceiling is constructed so that the adjustment can be made in order for the sprinkler head at the lower end to be substantially flush with the ceiling.

Some examples of prior art adjustable stem sprinkler drops for overhead fire protection sprinkler systems are the U.S. Pat. Nos. to Faulkner et al 3,194,316; Adams, Jr. 3,529,671; and Horwinski 3,847,392.

These prior art structures generally have not been entirely satisfactory since insurance companies and fire underwriters normally require that water under a pressure of at least 100 pounds per square inch be used in the sprinkler system and the industry standards require that the system be tested at between 200 and 250 pounds per square inch water pressure. Prior art structures which have utilized O-rings as a seal usually do not stand up under pressures in excess of 150 pounds per square inch without leaking while the prior art structures which included a compression gasket suffered from the possibility of a blow-out in which the entire adjustable stem including the sprinkler was forced out of the pipe by the water pressure.

SUMMARY OF THE INVENTION

The present invention is an adjustable stem sprinkler drop apparatus and the method of installing the same before the ceiling is placed in position so that adjustments can be made entirely from below the ceiling after the ceiling has been finished. In order to do this, a depending fixed sleeve is connected to the header and such sleeve has a reduced portion on the interior which is provided with internal threads to receive a threaded adjustable stem or nipple that extends below the ceiling line. The stem is provided with external threads over a substantial portion of its length so that it can be adjusted vertically along the internal threads of the reduced portion of the fixed sleeve. In order to provide a water-tight connection between the sleeve and the adjustable stem, the lower end of the sleeve is provided with external threads which receive the threads of a cap having a central opening slightly larger than the diameter of the adjustable stem so that the stem extends through the cap. A gasket or packing gland, which is generally triangular in cross-section, is carried by the cap and is arranged in a manner to fit between the lower end of the sleeve and the side walls of the adjustable stem so that when the cap is screwed into place the triangular gasket is forced into the space between the inner bore of the sleeve and the exterior wall surface of the stem so as to prevent the passage of water. However, the stem can be rotated relative to the gasket so as to adjust the distance of the sprinkler head at one end of the stem relative to the fixed sleeve so that the sprinkler head is positioned adjacent to the finished ceiling.

It is an object of the invention to provide an adjustable stem sprinkler drop for a fire protection sprinkler system which can be installed prior to the installation of a finished ceiling and which can be adjusted from a position below the ceiling so that the sprinkler is located closely adjacent to the ceiling without removing the adjustable stem from the header and without leakage when the system is being tested or is in operation.

It is another object of the invention to provide a method of adjusting a sprinkler drop of a fire protection sprinkler system after the ceiling of a building has been constructed.

DESCRIPTION OF THE PREFERRED EMBODIMENT

Figure 1:
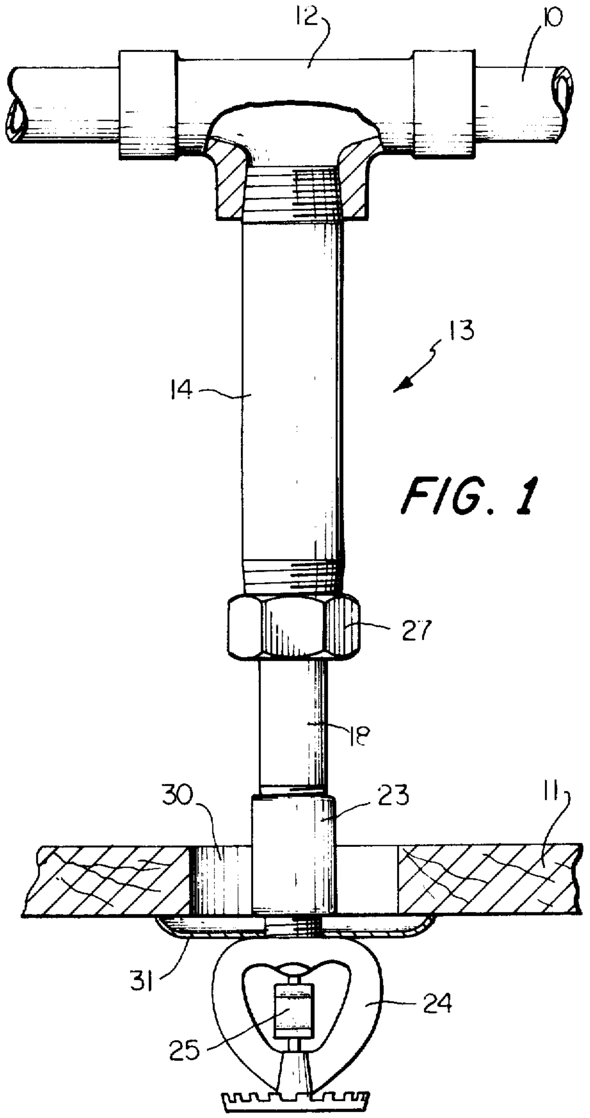
FIG. 1 is a side elevation illustrating one application of the invention.

With continued reference to the drawing, when a sprinkler system is installed within a building (not shown), a plurality of headers 10 are provided which are in generally parallel relationship with each other and such headers are placed in position before a ceiling 11 is installed. Each header is provided with a plurality of T-connections 12 which are spaced apart a predetermined distance in accordance with the desired spray pattern of the sprinklers so that the sprinklers provide overlapping patterns which completely cover the area below the sprinklers. When the building is provided with fixed ceilings, the headers 10 normally are located between the rafters and usually are supported by straps or the like (not shown). When a floating ceiling is to be installed, the headers may be located between the rafters or may be suspended below the rafters in which case the headers may extend in any desired direction and at any desired spacing relative to each other.

An adjustable stem sprinkler drop 13 is connected to each of the T-connections 12 and each drop includes a sleeve 14 the upper end of which threadedly engages the T-connection 12. The sleeve 14 may be of any desired length which terminates above the ceiling 11 and may be of any desired diameter. However, a sleeve having an internal bore 15 which is substantially one inch (25.40 mm) in diameter has been found satisfactory. The internal bore of the sleeve is provided with a relatively short reduced portion or shoulder 16 intermediate its ends and such reduced portion has internal threads 17 extending the full length.

An adjustable stem or nipple 18 having an external diameter of approximately 0.875 inch (22.225 mm) is provided with an external machine thread 19 extending a substantial portion of its length and such stem threadedly engages the reduced portion of the sleeve. The adjustable stem 18 preferably has a groove 20 adjacent to the inner end which receives a snap ring or retainer ring 21. Such retainer ring is applied to the groove 20 after the adjustable stem 18 has been assembled with the sleeve 14 to prevent unintentional separation.

The adjustable stem extends outwardly from the sleeve 14 and terminates below the ceiling 11 where the lower end of the stem or nipple has an external pipe thread 22 on which a female pipe connector 23 is mounted. The opposite end of the connector 23 threadedly receives a sprinkler 24 which is controlled by a conventional heat sensitive element 25, and such sprinkler may have any desired configuration and spray pattern.

Figure 2:
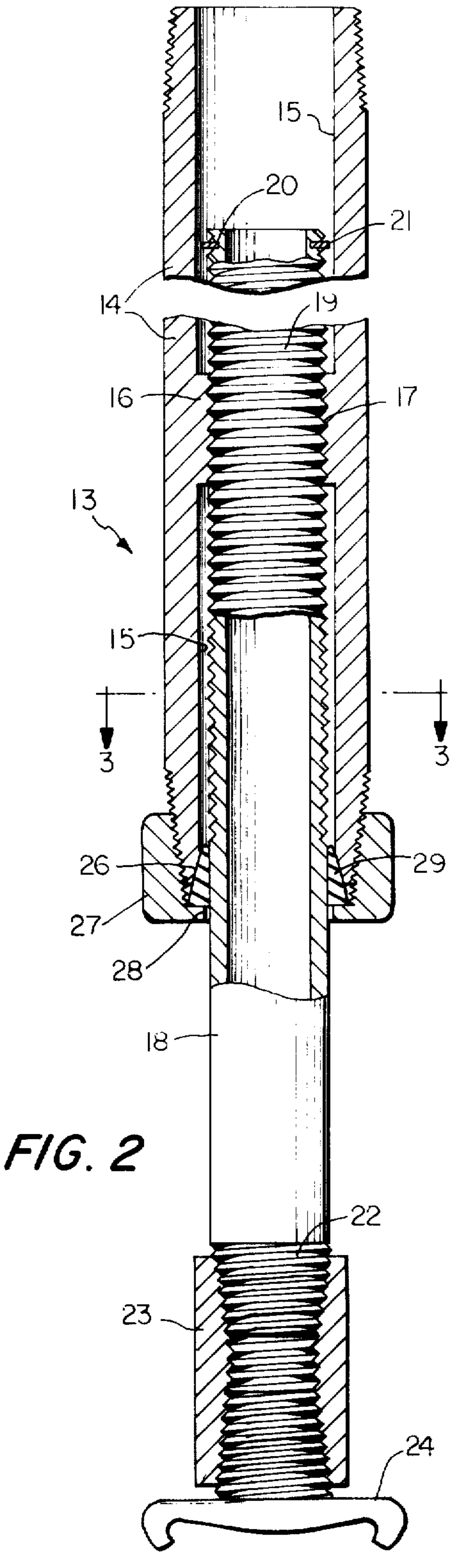
FIG. 2 is an enlarged fragmentary section of the adjustable stem sprinkler drop.
Figure 3:
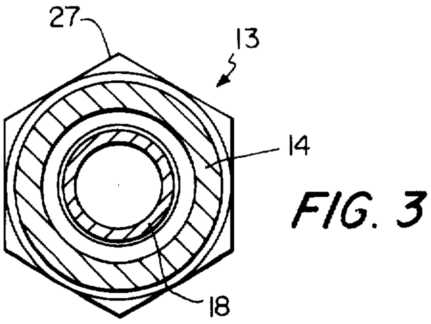
FIG. 3 is a section on the line 3—3 of FIG. 2.

In order to form a water-tight seal between the sleeve 14 and the adjustable stem 18, which will withstand water pressure in excess of 250 psi but which permits the adjustable stem 18 to be rotated relative to the sleeve 14, the lower end of the sleeve 14 has an internally tapered frusto-conical portion 26 which communicates with the bore 15 and extends to the lower end of the sleeve. A cap 27 is threadedly mounted on the exterior of the lower end of the sleeve 14 and such cap has an opening 28 which is slightly larger in diameter than the diameter of the adjustable stem 18 so that such stem passes freely therethrough. A circular gasket or packing gland 29, which is generally triangular in cross-section, is carried by the cap 27 and such gasket preferably has an inner diameter which slidably receives the adjustable stem 18, as illustrated best in FIG. 2. When the cap 27 is screwed onto the lower end of the sleeve 14, at least a portion of the gasket is disposed between the tapered frusto-conical portion 26 of the sleeve and the outer diameter of the adjustable stem to form a seal which prevents the passage of water under pressure but which permits the adjustable stem to be rotated and thereby adjust the position of the sprinkler 24.

In the operation of the device, a plurality of adjustable drops 13 are connected to each of the headers 10 and the lower end of each of the stems 18 is positioned below the estimated position of the finished ceiling 11 by rotating the stem in a counterclockwise direction until the snap ring 21 engages the upper surface of the shoulder 16. After all of the sleeves 14 have been connected to the T-connections 12 and tightened, the ceiling 11 is installed with such ceiling having openings 30 through which the lower ends of the adjustable stems extend. When the ceiling is finished, an escutcheon plate 31 is installed between the sprinkler 24 and the pipe connector 23 at the lower end of each of the stems 18. Thereafter clockwise rotation of the sprinkler from a position below the ceiling causes the adjustable stem 18 to rotate and move upwardly due to the external threads 19 until the escutcheon plate engages the ceiling and covers the opening 30. When all of the adjustable stems of the drops have been positioned, water under a predetermined pressure is introduced into the headers where it flows through the sleeves 14 and the adjustable stems 18 to the sprinklers 24.

If a fire should occur in the area of one or more of the sprinklers, the heat sensitive element 25 of each of the adjacent sprinklers opens a valve and permits water under pressure to flow through the sprinklers where such water is sprayed onto the fire.

We claim:

1. An adjustable stem sprinkler drop for a fire protection sprinkler system comprising sleeve means connected at one end to a source of water under pressure, said sleeve means having a bore with an internally threaded reduced portion intermediate its ends, an elongated adjustable stem having external threads at one end threadedly engaging said reduced portion of said sleeve means, the other end of said stem being positioned below the other end of said sleeve means, the external surface of said stem being spaced from the internal bore of said sleeve means, cap means threadedly mounted on said other end of said sleeve means, and a circular gasket having a generally triangular cross-section carried by said cap means, said gasket having an inner diameter of a size to slidably receive the external surface of said adjustable stem, whereby said cap means is screwed onto said sleeve means so that said gasket forms a seal to prevent the passage of water under pressure but which permits rotation of said adjustable stem relative to said sleeve means.

2. The structure of claim 1 including a sprinkler mounted on said other end of said stem.

3. The structure of claim 1 in which said stem includes a groove located adjacent to said one end, and retaining means mounted in said groove for engaging said reduced portion of said sleeve means, so that said stem cannot be unintentionally separated from said sleeve means.

4. The structure of claim 1 in which said sleeve means has an internally tapered frusto-conical portion of said other end of said sleeve means for cooperative engagement with said gasket.

5. The method of adjusting at least one sprinkler drop of a fire protection sprinkler system having at least one header located above the ceiling of a building, comprising the steps of: securing a fixed sleeve to said header, threadedly connecting one end of an adjustable tubular stem to the interior of said sleeve, the other end of said stem being positioned below said sleeve, slidably mounting a circular gasket having a triangular cross-section on the outer surface of said adjustable stem, forcing a portion of said gasket between the inner diameter of said sleeve and said outer surface of said stem to form a water-tight seal but permitting rotation of said stem relative to said gasket and said sleeve, constructing a ceiling below said gasket and said sleeve and above said other end of said adjustable stem, attaching a sprinkler to said other end of said stem in spaced relationship to said ceiling, and rotating said sprinkler and said stem relative to said sleeve so that the threaded engagement between the stem and the sleeve raises the stem until the sprinkler engages the ceiling.

* * * * *